11-28-72 XR 3,704,467

United States Patent

Frock

[15] 3,704,467

[45] Nov. 28, 1972

[54] REVERSIBLE RECORD AND STORAGE MEDIUM

[72] Inventor: Brian G. Frock, Dayton, Ohio

[73] Assignee: The National Cash Register Company, Dayton, Ohio

[22] Filed: Sept. 14, 1970

[21] Appl. No.: 72,234

[52] U.S. Cl............346/1, 106/DIG. 6, 219/121 LM, 340/173 CH, 346/21, 346/76, 346/135, 350/160 P

[51] Int. Cl.............................................G01d 15/34

[58] Field of Search.....346/1, 21, 76, 135; 96/114.1, 96/88 R; 106/DIG. 6, 53; 340/173 CH; 250/65 T; 219/121 L, 121 LM; 117/123 B; 350/160 P, DIG. 1

[56] References Cited

UNITED STATES PATENTS

| | | | |
|---|---|---|---|
| 3,087,869 | 4/1963 | Hamm et al. | 204/2 |
| 3,208,860 | 9/1965 | Armistead et al. | 106/54 |
| 3,438,022 | 4/1969 | Teeg et al. | 340/324 |

*Primary Examiner*—Joseph W. Hartary
*Attorney*—Jerome F. Kramer, Joseph P. Burke and E. Frank McKinney

[57] ABSTRACT

This disclosure is directed to a reversible, yet optionally permanent dual electro-optical record and storage medium, bistable in both the optical and electrical modes and non-volatile in the electrical mode having high resistivity contrast in the electrical mode between the write and erase states, high resolution and contrast in the optical mode between the write and erase states. The record medium can be used for display purposes and is capable of high bitpacking density and thermal micro-recording and erasure and comprises a baked oxide solid film material containing lead oxide, boron oxide, copper oxide and silicon dioxide (silica) as major components and optionally minor concentrations of other oxides (depending on the glass substrate upon which the record medium is formed).

10 Claims, No Drawings

REVERSIBLE RECORD AND STORAGE MEDIUM

The present invention was occasioned by a need for a high capacity record medium for storage of information wherein the storage medium is not easily susceptible to environmental influences of temperature, humidity, etc. Moreover, the desired record medium would be long-lived and substantially inert. A further requisite property of such record medium is that it be capable of optionally permanent storage or erasure and be non-volatile (viz., not require the maintenance of an energy form, e.g., electrical, in order to accomplish storage). Moreover, it is desired that the record medium sought possess sufficient resistance to fatigue upon repeated write-erase-write cycles and during storage between such cycles so as to enable extended usage and storage without need for replacement thereof. A still further objective in such a medium is the ability to write and erase at different energy levels so as to render the record medium less susceptible to introduction of errors.

Glass materials containing lead oxide are disclosed in the prior art, which materials are reported to be capable of being made clear or black by proper heat treatment. One representative prior art patent of this type is U.S. Pat. No. 2,353,354 to Nordberg, which discloses that certain glasses containing silica, alkali metal oxide, lead oxide, and tin oxide when melted reducingly through the addition of a reducing agent can be made either clear or black (opaque) by proper heat treatment. Such glasses require differential heating or cooling to produce in selected areas thereof portions which are of contrasting color, e.g., black on clear, or clear on black. Such articles require extended time for heating and are not disclosed as suitable to record or store electrical information or possess the ability of having a substantial difference in resistivity in the written and erased states.

U.S. Pat. No. 3,354,064 to Letter describes lead fluorosilicate glasses, e.g., those which contain silica, lead oxide and lead fluoride and which are capable of producing relatively opaque color when subjected to electron bombardment which can be focused in certain regions thereof. Areas on which no writing is to appear can be protected by shields or masked to prevent the imposition of the opaque color therein. The color thus imposed is stated to be permanent or reversible according to the sequence of thermal treatment or exposure to the electron bombardment. Thus, erasure can be secured within reasonable erasure times only by heating said glass whereas the writing requires the imposition of the electron radiation. While the patentee states that the energy requirements are relatively low for the "write" capability, the exposure to electromagnetic radiation can present certain health hazards and even in the low level energy can require the use of voltages in the range of 100 to 600 volts which can increase the expense of the writing cycle.

A different approach to the problem is offered by Schreiber, U.S. Pat. No. 3,323,244 which utilizes phototropic glass for dynamic displays. According to the Schreiber patent, dynamic displays can be provided in phototropic glass compositions chosen so that optical transmittance of visible light is variable with the intensity of electromagnetic radiation (visible light) projected on the glass to produce therein comparatively opaque regions. Hence, the writing is done by electromagnetic radiation and upon removal thereof the darkened areas eventually become light. The erasure can be accelerated by heating the exposed areas. There is no disclosure of a record medium having the ability to produce write-erase states having substantially different electrical resistivity; nor is there any indication that the written information can be stored. Of course, storage ability would appear to be directly opposite to the desired objectives of dynamic displays indicated by Schreiber.

Other glass record media are known which possess tenebrescence, viz., that property of material of reversibly darkening and bleaching under suitable radiation. For example, U.S. Pat. No. 3,253,497 to Dreyer teaches an information storage system having a tenebrescent storage unit utilizing scotophor materials, e.g., Hackmanite, NaCl $(NAAlSiO_4)_3$, which is stated to display a raspberry red color when activated by ultraviolet light. The writing can be conducted by subjecting the glass containing the Hackmanite to other forms of high energy, for example, X-rays, alpha particles, gamma rays, Cathode rays, etc., and the like. Erasure can be accomplished by radiation with short wave lengths, e.g., radiation of the colored scotophor with a wave length which is maximally absorbed by the colored scotophor. An elaborate system is disclosed for writing, scanning (reading) and erasing based upon an optical information storage device. Dreyer fails to disclose a record and storage medium capable of distinguishing by significantly different electrical resistivity between the "write" and "erase" states, respectively. A wide variety of tenebrescent materials are disclosed including various metal halides and metal oxides, but nowhere does Dreyer disclose the combination of lead oxide and copper oxide in a thin film record medium of the type contemplated in accordance with this invention.

The dual electro-optical record and storage medium of this invention is comprised of a solid film material containing lead oxide, boron oxide, copper oxide and silica as major components and such optional components as the oxides of iron, aluminum, manganese, magnesium, calcium, beryllium and alkali metal oxides in smaller concentrations. Additionally, this record medium can contain some metallic lead and metallic copper due to incomplete oxidation during the preparation. As between lead oxide and copper oxide, the concentration of lead oxide can exceed that of copper oxide in the record medium or vice versa and the record medium can be a plurality of layers, the composition of each differing slightly or greatly from the others. Each such layer can thus contain a predominant concentration of either lead oxide or copper oxide depending largely upon the procedure for preparing the record medium. The same observation is true regarding the concentrations of boron oxide and silica. The dual electro-optical bistable record and storage medium of this invention possesses a beneficial and unique combination of advantages and avoidance of disadvantages compared to prior art record media including some of the typical prior art patents referred to herein.

Advantages capable of attainment with this invention include sharp contrast between the write and erase states both in the optical and electrical modes; a non-volatile memory capability in the electrical mode (namely, the memory capability in the electrical mode is retained even when the energy source is turned off); the optical and electronic record media is bistable in both the optical and electronic states; viz., stable in both the write and erase states in both the optical and electrical modes; the electro-optical record medium is useful in display systems including those requiring high visual resolution capacity; the electro-optical record media can be utilized for microrecording, viz., recording and storage purposes involving indicia or data so small as to be not readily discernible by the human eye; the property of comparative inertness, longevity, and fastness (non-fading) combined with high bit-packing density for both optical and/or electrical storage of information; the method of writing and erasing, itself, does not destroy, abraid or weaken the record medium; the record medium allows uniformity to be obtained in the writing state both with respect to differences in electrical resistivity and optically distinguishable colors or shades; the attainment of reasonably rapid switching times; the record medium displays good fatigue resistance when repeatedly switched between the low resistivity and high resistivity stages in the electrical mode giving little indication of fatigue; the record medium permits the use of readily differentiated thermal energy levels for writing and erasing thus rendering the medium less susceptible to introduction of errors; switchability in electrical resistivity can be controlled between virtually any desired limits in that the change in resistivity with temperature is in an analog relationship, e.g., like a rheostat as it is heated in a temperature-time relationship; the medium is not readily susceptible to harmful degradation by varying atmospheric temperatures and humidity conditions; thus the storage environment of the record and storage medium need not be carefully controlled as to temperature and humidity; and the medium affords optionally permanent yet erasable and reusable data storage facilities in both the optical and electrical modes.

While a reducing atmosphere or environment is required for writing; when using a gas-oxygen torch, e.g., a butane-oxygen torch as a heat source, no extraneous reducing atmosphere is required because the reducing portion of the torch flame suffices to provide it. In certain cases it may be desirable to provide a reducing medium, atmosphere(s) or environment(s), e.g., alchohols, such as ethanol, ketones (acetone), aldehydes (acetaldehyde), ethers (diethyl ether), etc.

The record medium of this invention can be prepared readily by thermally evaporating copper and lead on a silica-containing substrate, which preferably also contains boric oxide ($B_2O_3$), and heating the deposited metals in the presence of available oxygen, e.g., in air, to form the record medium. The record medium can contain lead and copper in the reduced form but in small concentrations. One satisfactory method to form the record medium is to clean the glass substrate thoroughly, place it in a conventional vacuum Bell jar thermal evaporation apparatus containing finely divided metallic lead and metallic copper in a boat and heat the boat to first deposit the lead then the copper. Actually, at first comparatively pure lead is deposited but before pure copper is deposited on the glass, a mixture of lead and copper is deposited on the pure lead coating. These mixtures are richer in lead than copper at the lower temperatures and the concentration of copper increases at the higher temperatures over the range from about 750° to 1,400° C. The lead starts to deposit at about 750° to 850° C. whereas the copper evaporates starting at about 1,300° C. During the evaporation procedure, the glass substrate is heated to temperatures of about 300° C. or higher. After cooling, the vacuum is broken and the coated substrate is removed from the vacuum coating apparatus and baked in a conventional oven containing air at temperatures of from about 400° C. to about 700° C. for from about 10 to about 30 hours to effect oxidation. Twenty hours at 500° C. has yielded uniformly good results.

After deposition of the lead-copper coating but before the oxidation thereof, the lead portion of the coating is silver-like in color when viewed through a transparent borosilicate ("Pyrex"-type) glass substrate whereas the coating last applied is copper-colored. At this stage the copper coating is highly conductive and has a very low resistivity, usually of less than about 1 ohm per square. After the oxidation treatment the record medium has a very low conductivity, an extremely high surface resistance of about $10^6$ ohms or higher for a measuring separation of approximately 1.2 centimeter (one-half inch) and a color (viewed from coating side) which is grey-black (more grey than black). The color of that portion of the record medium first bound to the siliceous substrate is black-grey (more black than grey).

After cooling of the oxidized record medium, the highly conductive copper colored or "write" state can be brought about at any desired time by heating (thermally switching) the record medium in the proper environment (depending upon the heat source used) at temperatures of about 600° C. to about 900° C. The "-write" state of the medium displays very low resistivity, viz., from about 0.05 to about 2.0 ohms per square.

Erasure of the aforementioned written medium can be accomplished by heating to temperatures of about 200° C. to about 550° C. and a grey-black color results. As noted, the "write" state has very low resistivity. However, the "erase" state has very high resistivity, viz., from about $10^4$ to about $10^{12}$ ohms per square. This represents an order of difference of resistivity of from $10^3$ to $10^{11}$ ohms per square between the "erase" and "write" states. The term "ohms per square" is a conventional term used to measure surface resistivity and resistivity differences between surfaces and is a comparatively pure number which reflects resistivity of the surface regardless of the area thereof. Of course, the resistivity of a surface can differ along various portions or areas of this same surface.

A variety of silica and more preferably silica/boron oxide-containing substrates can be used, including, but not limited to (1) borosilicate glass substrates comprised mainly of silica and boric oxide and containing lesser concentrations of alumina and alkali metal oxide(s), e.g., lithium oxide, sodium oxide, potassium oxide, cesium oxide and/or rubidium oxide; (2) alkali-free alumina borosilicate glasses containing a predominant concentration of silica and more boron oxide than alumina; (3) soda-lime-silica glasses and (4) substrates containing mostly silica, e.g., quartz. The use of borosilicate glasses is preferred in accordance with this invention especially those containing some alumina. Typically such glasses contain:

| Components | Concentration (Wt.%) |
|---|---|
| boric oxide | 8 to 20 |
| silica | 75 to 90 |
| alumina | 1 to 5 |
| alkali metal oxide(s) | 0 to 5 |
| oxides of Al, Mn, Fe, Be, Ca, Mg | 0 to 5 |

Atomic absorption and emission spectroscopic analysis of representative oxidized record media prepared with a 60:40 lead: copper charge (wt. basis) indicate that there is some migration of substrate materials from the substrate into the coated layer to form the record medium. Hence, typical analysis of the record medium after formation on a typical "Pyrex" glass substrate (having approximately: 85 weight percent silica, 13 weight percent boric oxide, the remainder being mainly alumina and lithia with trace amounts of other inorganic oxides), is as follows:

| Components | Concentration (Wt.%) |
|---|---|
| lead | 15 to 25 |
| silicon | 10 to 25 |
| copper | 15 to 25 |
| boron | 15 to 25 |
| aluminum | 1 to 25 |
| alkali metal oxides | 0 to 5 |
| iron, aluminum, manganese, beryllium | trace amounts |
| calcium, magnesium | trace amounts |
| oxygen | (to make 100%) difference |

X-ray diffraction studies on the record media indicate that the pattern characteristic of the record media of this invention do not match any reference standards for copper, boron, silicon, lead, iron, or any oxides thereof. This suggests that a new and different structural orientation is present in the record media.

The record medium can have thicknesses ranging from about 0.00010 to about 0.015 centimeters; usually, however, the record medium thickness ranges from about 0.00020 to about 0.012 centimeter.

A memory can be formed of one or an array of such record media, viz., a plurality thereof. Instead of depositing the Pb/Cu coating on an entire surface of a substrate, only selected regions can be coated.

As noted above, the weight ratio of lead to copper used in preparing the record media can vary. Thus, the Pb:Cu wt. ratio can range from about 0.25 to about 5:1, usually ranges from about 0.5 to about 3:1 and more usually ranges from about 1 to about 2:1.

A further advantage of this invention resides in the fact that the temperatures utilized for writing and erasing, respectively, offer a sufficient basis for differentiation to reduce error and inadvertent writing or erasure, respectively. For example, writing is customarily conducted at temperatures of about 650° C. to about 850° C. and more usually from about 750° C. to about 850° C., whereas the usual erasure temperatures lie between about 250° C. and about 550° C. Thus, it can be seen that a usual temperature differential of approximately 150° to 350° C. exists between the temperatures employed to produce the write and erase states. At the lower erasing temperatures of about 200° C. and below, switching tends to be very slow, in some cases taking a matter of hours. The use of the higher erasure temperatures, e.g., 400° to 500° C. yields much faster (instantaneous) switching times measured in fractions of a second.

Since the means of writing and erasing utilize the same form of energy (thermal) although at different levels; the present invention does not require maintenance of separate types of energy to accomplish writing or erasure of information, respectively. No energy is required for storage. A variety of heat sources can be employed for switching, the prevailing considerations being the definition or resolution required, with laser beams giving finer definition and number of lines per lineal inch of record medium than torches for writing.

While writing can be performed by laser, torch, etc., erasure is usually by torch. The use of laser beams to record information in both the electronic and optical modes is preferred where high-bit-packing densities and/or high optical resolution characteristics are desired in the record medium which can be used as a display, memory, etc.

Within the above context it will be realized that a variety of heat sources can be employed for the switching. Suitable heat sources include, but are not limited to the following: focused projection lamps (150 watt tungsten projection lamp), 500 watt quartz iodine lamps, torches, such as gas-oxygen torches, e.g., butane-oxygen torches, argon and otHer laser beams, e.g., ruby, carbon dioxide, etc. and any flame or other heating means capable of attaining the requisite temperatures for the purpose of writing or erasing, as the case may be.

In addition to the coating technique described above, the record media of this invention can be formed by other procedures, e.g., by thermal evaporation in a vacuum first depositing copper then lead followed by oxidation; by thermal evaporation in a vacuum codepositing copper and lead followed by oxidation; by preparing a dispersion of finely divided metallic lead oxide and copper oxide, drawdown coating followed by sintering in an oxidizing atmosphere; by deposition of the oxides via spraying the lead and copper metal salts, e.g., as halides or organic salts in the presence of available oxygen; sputtering followed by oxidation; etc.

The present invention will be described in great detail in the examples which follow. These examples are included herein as illustrative of the present invention and are not intended to be limiting thereon.

EXAMPLE

TYPICAL PROCEDURE FOR PREPARING RECORD MEDIUM

A "Pyrex" transparent glass substrate containing approximately: 85 wt.% $SiO_2$, 13 wt.% $B_2O_3$ with the remainder $Li_2O$ and $Al_2O_3$was cleaned thoroughly by sequential washings in distilled water, isopropanol, acetone, xylene and trichloroethylene. Then the substrate was vapor degreased in trichloroethylene and dried. Thereafter it was immersed in aqueous "Alconox" detergent for 6 minutes and washed under running distilled water several times and dried. The dried substrate was then vapor degreased in pure perchloroethylene and transferred face down into a clean Bell jar vacuum system equipped with electrical heating units and the vacuum was pumped down to 3 times $10^{-6}$ Torr.

The substrate surface (lower) to be coated with the record medium was placed approximately 28 to 30.5 centimeters from a tungsten evaporation boat having a 60:40 weight percent charge of lead pellets:copper, respectively. The form of copper used was copper wire cleaned with nitric acid. An electric heater containing radiant filaments was placed about 5 centimeters above the upper (uncoated) surface of the substrate. The substrate was heated to approximately 200° to 300° C. and the boat (containing electrically resistive heating elements) was heated to effect evaporative deposition of the metals. The lead evaporated at temperatures of about 750° to 800° C. and the copper evaporated at temperatures of approximately 1,300° C. and higher. Between these extremes mixtures of lead and copper evaporated and deposited rich in lead at the lower temperatures above about 800° C. and rich in copper at the higher temperatures below 1,300° C. Of course, all of the evaporated metal does not deposit onto the substrate. For example, some deposits on the boat possibly reacting therewith to form tungsten alloys. After deposition over a 1 hour period was completed, the system was allowed to cool to ambient temperatures and then the vacuum was broken. Deposition can be conducted more rapidly using separate boats for lead and copper or by codepositing them. After vacuum deposition the lowermost portion of the record medium (nearest to the glass substrate) appears silver when viewed through the glass and the upper portion of the record medium (remote from the substrate) appears copper colored.

The coated substrate (having a total coating thickness of approximately 0.0015 cm.) was then transferred to an air oven and heated at approximately 500° C. for 20 hours to effect oxidation. After oxidation, the conductivity is reduced quite markedly accompanied by a large increase in resistance from less than 1 ohm/square before oxidation to about $10^6$ ohms (or or higher) for a probe separation of 1.2 centimeters. The upper portion of the record medium shows a grey-black color, and the color of the lower portion (viewed through the glass) appears black-grey.

The above record medium formation procedure was repeated except using conventional soda-lime-silica glass, quartz and "Corning 7059" (alkali-free alumina borosilicate "Pyrex"-type) glass substrates.

EXAMPLE

THERMAL SWITCHING OF RECORD MEDIA AND FINENESS OF RESOLUTION

Using the preparation procedure described in Example I, the resulting record media having smooth, dark-colored upper surfaces. The surfaces can be thermally switched ("write") to a highly electrically conductive copper colored state. One method of thermal switching is to heat the surface of the record medium with the flame of a $C_1$ to $C_4$ hydrocarbon, e.g., methane or butane gas-oxygen torch. When the sample is heated to the required temperatures (600° to 900° C.) and the reducing portion of the torch flame is brought into contact with the sample, the surface of the solid film material will switch to a copper colored state. Then the flame is removed quickly allowing the copper colored state to remain. Alternatively, a laser beam can be used in the presence of an extraneous reducing agent, e.g., ethyl alcohol to "write" on the record media. Once the material is switched to the copper colored state it is stable therein.

The gas-oxygen torch can also be used to switch from the copper colored state to a grey-black ("erase") colored state. Erasure can be conducted at higher temperatures even into the writing temperatures range, but the use of these higher temperatures is usually considered less desirable due to higher costs involved. For example, at temperatures of 200° to 500° C. the record medium switches from the copper color to a grey-black color. This grey-black colored state can be switched back to the copper colored state in the manner described above. In addition to the visible change in color, the two different states show the large difference in resistivity which has been described previously.

The record medium can be switched to the two different states by other procedures also. One method is to heat the record medium to the requisite temperatures in a furnace and immediately plunge it into alcohol, ether, acetone or other similar solvents which can act as reducing agents. An alternative is to suspend the heated record medium in gaseous reducing agent (vapors).

The copper colored state is switched to the grey-black state at the time desired by heating the sample in a furnace or on a hot plate to the temperature required for this switching process. At lower temperatures (200° to 250° C.) the switching takes a long period of time while at higher temperatures (500° to 550° C. and higher) the switch is accomplished more quickly.

The use of a torch as a heat source for switching the record medium to "write" thereon is satisfactory for displays where the fineness of resolution of line can be measured in millimeters or larger as the area switched depends upon the size of the torch used which in turn will regulate the size and area of the flame used in the switching process. Hence, the smallest line width attainable practically with most torches is measured in millimeters. Much finer line widths have been obtained when switching the sample with a laser beam to "-write." Using a laser beam as a heat source to switch the sample to the copper colored state, the usual line width obtained is 100–150 microns although line widths as narrow as 75–80 microns have been obtained.

Of the four types of samples tested, those having borosilicate glass substrates yielded superior results both regarding the smoothness and uniformity of the record media and the thermal switchability thereof. In the case of the record media formed on soda-lime-silica glass and quartz, the record media were thermally switchable between the aforementioned "write" and "erase" states, but the solid film materials exhibited a non-uniform thickness apparently due to the lead "-balling-up" which is suggestive of an adhesion problem.

While the examples illustrate the invention in great detail; the present invention is not necessarily limited to the procedure for forming the record media, thermal switching means, etc., set forth hereinabove. For example, the prepared record media can have electrically conductive, e.g., silver paste, electrodes painted thereon and thermal switching from the "write" to the "erase" state can be performed by applying the requisite potential, e.g., 200 volts to the record medium via the applied electrodes. Thermal switching can also be accomplished from the "write" to "erase" state in an air furnace or by using a gas-oxygen torch.

Instead of using a tungsten evaporation boat, the boat can be made of molybdenum, tantalum or alloys thereof or with tungsten.

The record media of this invention can be thermally switched throughout their entire thickness, e.g., to the "write" state, using a laser beam in the presence of ethanol or other equivalent reducing agent.

What is claimed is:

1. A reversible yet optionally permanent, dual electro-optical record and storage medium bistable in both the optical and electrical modes and non-volatile in the electrical mode having high resistivity contrast in the electrical mode between the write and erase states, high optical resolution and contrast in the optical mode between the write and erase states and capable of high bit-packing density and thermal micro-recording and erasure comprising a solid film material comprised of lead oxide, boron oxide, copper oxide and silica as major components.

2. A medium as in claim 1 wherein said material includes alumina as a minor component.

3. A medium as in claim 1 wherein a portion of the lead oxide in selected areas of a major surface of said medium is present in the reduced form as lead.

4. A medium as in claim 1 wherein a substantial portion of the copper oxide in selected areas of a major surface of the record medium is present in the reduced form as copper.

5. A medium as in claim 1 having a thickness ranging from about 0.0001 to about 0.015 centimeter.

6. A method of preparing the record medium of claim 1 comprising depositing lead and copper in a weight ratio of about 0.25 to about 5.0:1 respectively, onto a substrate containing silica and boron oxide as essential components and heating said deposit at temperatures ranging from about 400° C. to about 700° C. in the presence of available oxygen.

7. A method of writing data areas in both optical and electrical modes comprising heating pre-selected areas of the record medium of claim 1 to temperatures ranging from about 600° C. to about 900° C. in the presence of a reducing medium and removing said heat.

8. A method as in claim 7 wherein said writing is conducted at temperatures ranging from about 750° C. to about 850° C.

9. A method of erasing data areas stored in both optical and electrical modes in the medium of claim 1 by subjecting such data areas thereof sought to be erased to temperatures ranging from about 200° C. to about 550° C.

10. A method as in claim 9 wherein said erasure is conducted at temperatures ranging from about 250° C. to about 550° C.

* * * * *